May 4, 1954
J. P. MARCY
2,677,520
COMBINATION GLASS HOLDER AND ASH
TRAY FOR TABLES AND THE LIKE
Filed March 21, 1949
2 Sheets-Sheet 1
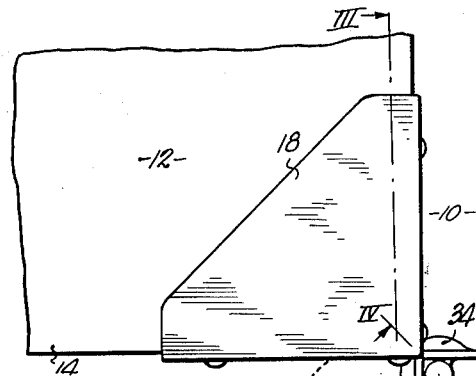
Fig. 1.
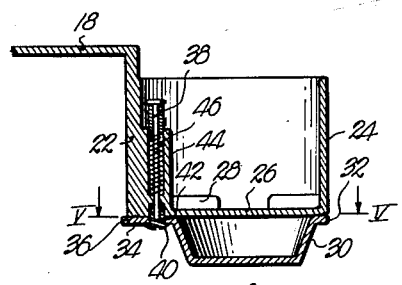
Fig. 4.
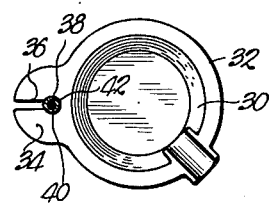
Fig. 5.
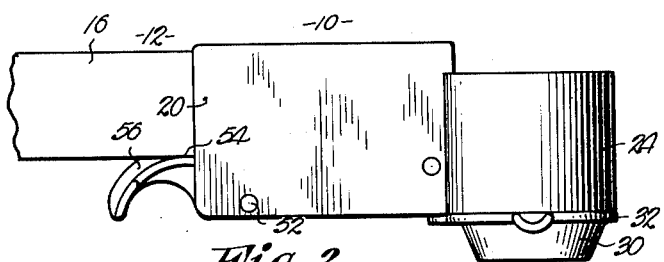
Fig. 2.
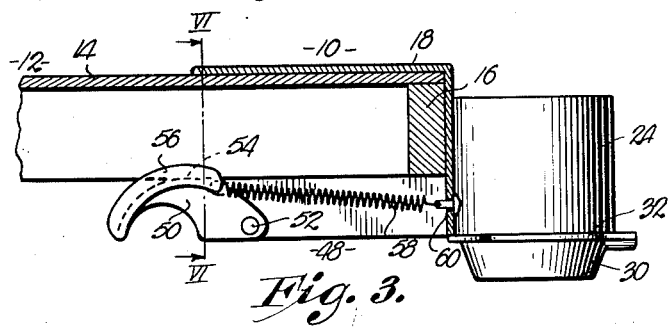
Fig. 3.
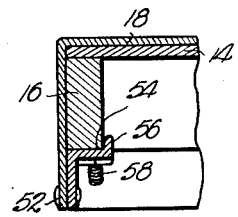
Fig. 6.
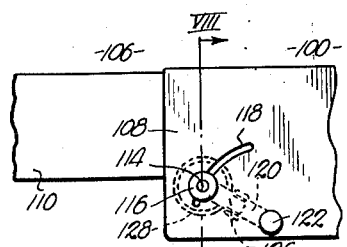
Fig. 7.
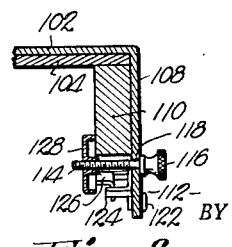
Fig. 8.
INVENTOR.
John P. Marcy
BY
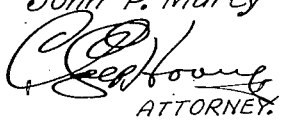
ATTORNEY.

May 4, 1954

J. P. MARCY 2,677,520

COMBINATION GLASS HOLDER AND ASH TRAY FOR TABLES AND THE LIKE

Filed March 21, 1949

INVENTOR.
John P. Marcy
BY
ATTORNEY.

Patented May 4, 1954

2,677,520

UNITED STATES PATENT OFFICE 2,677,520

COMBINATION GLASS HOLDER AND ASH TRAY FOR TABLES AND THE LIKE

John P. Marcy, Alhambra, Calif.

Application March 21, 1949, Serial No. 82,624

12 Claims. (Cl. 248—222)

1

This invention relates to structure for mounting a combination ash tray and glass holder assembly upon a card table or other support, the primary object being to provide means for releasably clamping the mounting structure to the table for rigid attachment thereto, all parts being formed and disposed to permit attachment without modifying or otherwise mutilating the table itself and being capable of holding the assembly against displacement at all times irrespective of the abuse it may undergo.

The most important object of the present invention is to provide a combination ash tray and glass holder assembly having a support provided with parts that not only overlie and rest upon a portion of the top of the table, but extend downwardly into overlapping relationship with a portion of the down-turned flange or side of the table, there being provided releasable means on the downwardly extending portion of the support adapted to engage the table flange and hold the support tightly against the table with the aforesaid down-turned flange clamped between the holding means and the down-turned portion of the support.

Another important object of the present invention is to provide an assembly of the above mentioned character wherein the releasable clamping means not only holds the support in tight engagement with a portion of the top of the table but in tight engagement with that portion of the side of the table that the support overlies.

Another important object of this invention is to provide an attachment for card tables or the like as above set forth that may be universally used as an attachment for virtually any type of table, irrespective of the size and character thereof, provided only, that the table has a top and a down-turned flange that may be utilized in holding the assembly clamped to the table.

A further object of the present invention is to provide a combination glass holder and ash tray assembly capable of use with a table having at least one corner, the support being provided with a pair of down-turned members that bear against and overlap the side of the table, each member being provided with a manually releasable clamp that bears against the innermost face of the respective table side to hold the support against lateral displacement in any direction whatsoever.

Other objects of the present invention include the way in which an ash tray is swingably and removably mounted on the support; the way in

2 which yieldable means is provided to hold the releasable clamp in an operative position; the manner in which the releasable holding means is rendered easily accessible to the user, whereby the entire assembly may be attached to and removed from the table at will; the manner in which the ash tray and glass holding assembly is rendered removable and separable from the support therefor; the way in which the clamping means is adjustable to accommodate tables having down-turned flanges of differing widths; and many other minor objects of the several modifications hereof, all of which will be made clear or become apparent as the following specification progresses.

In the drawing:

Fig. 1 is a fragmentary, top plan view of a conventional card table showing a top plan view of one form of my combination glass holder and ash tray made in accordance with the present invention operably mounted on such table.

Fig. 2 is a side elevational view thereof.

Fig. 3 is a cross-sectional view taken on line III—III of Fig. 1, looking in the direction of the arrows.

Fig. 4 is a cross-sectional view taken on line IV—IV of Fig. 1.

Fig. 5 is a top plan view of the ash tray per se.

Fig. 6 is a fragmentary, detailed, cross-sectional view taken on line VI—VI of Fig. 3, looking in the direction of the arrows.

Fig. 7 is a fragmentary, side elevational view of another form of my present invention showing a modified clamping means.

Fig. 8 is a cross-sectional view taken on line VIII—VIII of Fig. 7.

Figure 9:
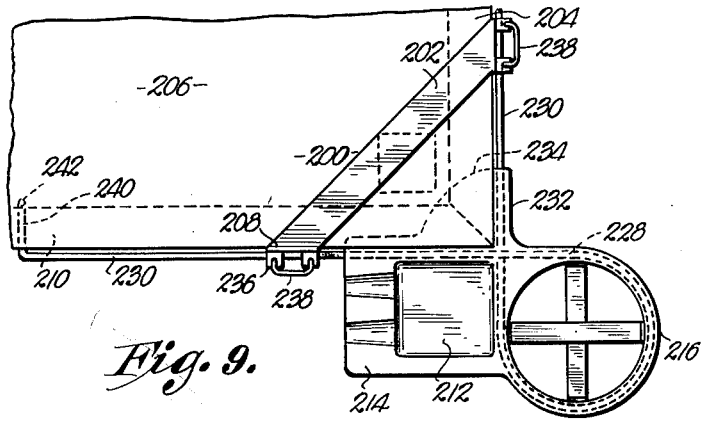
Fig. 9 is a top plan view of a third form of my present invention.
Figure 11:
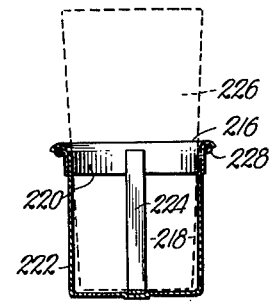
Fig. 11 is a cross-sectional view taken on line XI—XI of Fig. 10.
Figure 10:
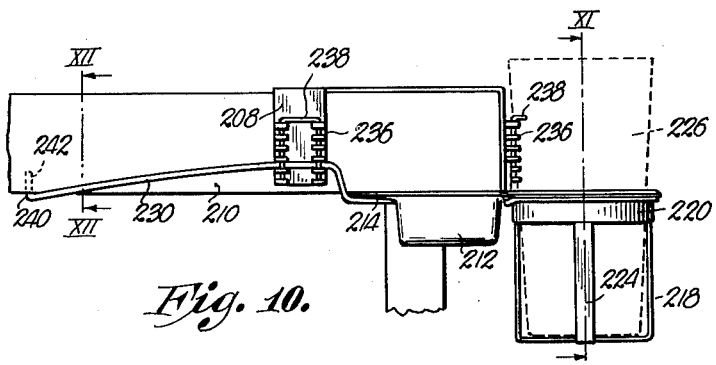
Fig. 10 is a side elevational view of the assembly illustrated in Fig. 9.

In the form of my invention illustrated in Figs. 1 to 6 inclusive, there is provided a support broadly designated by the numeral 10 and adapted to be mounted upon a table 12, that may constitute a conventional card table or any other article of furniture having a top 14 and a peripheral down-turned flange or side 16.

Other than the fact that this form of my invention is particularly adapted to a table having a corner as illustrated, the particular form of table 12 is of no importance to the invention.

Support 10 is provided with a flat, substantially triangular-shaped plate or element 18 having formed integrally therewith a pair of down-turned members 20 and 22. The down-turned members 20 and 22 are joined integrally at their proximal edges and the entire support 10 is disposed at one corner of table 12 with the element 18 overlying the top panel 14 and the side members 20 and 22 overlapping and bearing flatly against corresponding sides 16 of table 12.

A tubular, open-top glass holder 24 is secured directly to the support at the point of merger between members 20 and 22, either by casting integrally therewith or by welding. The hollow holder 24 has a solid bottom 26 provided with a plurality of radial upwardly extending ribs 28 for holding the glass in spaced relationship to bottom 26.

A cup-like open top ash tray 30, is provided with an annular out-turned flange 32 at its uppermost edge, having a diameter substantially the same as the diameter of holder 24. An ear on flange 34 of ash tray 30, has a slot 36 having a width slightly greater than the diameter of a vertically reciprocable pin 38 that in turn has a flanged button 40 on the lowermost end thereof. An enlarged opening 42 at the innermost end of the slot 36, normally receives the button 40 in the manner illustrated in Fig. 4.

A tubular boss 44 on the innermost face of the glass holder 24, slidably receives the pin 38 and a spring 46 coiled about the pin 38 yieldably holds the latter at the uppermost end of its path of travel. Accordingly, the ash tray may be removed for cleaning by pressing the pin 38 downwardly to release the button 40 and placing a portion of the pin 38 within the slot 36, whereby ash tray 30 can be disengaged from the holder 24. As shown in dotted lines in Fig. 1, ash tray 32 is swingable upon the button 40 to and from a position underlying the glass holder 24.

The mechanism for holding the support 10 for glass holder 24 and ash tray 30 upon the table 12, is broadly designated by the numeral 48. It is noted in Figs. 2, 3 and 6 that the two members 20 and 22 extend a distance below the lowermost edge of the flange 16 and the mechanism 48 includes an arcuate, swingable lever 50. There is a holding mechanism 48 for each member 20 and 22 respectively and each lever 50 is pivotally secured thereto as at 52 below the lowermost edge of flange 16. The two levers 50 are each provided with a lateral, inwardly extending arcuate flange 54, serving as a cam in that the same underlies and bears against the flange 16 in the manner illustrated in Figs. 2, 3 and 6 of the drawing.

The levers 50 are also provided with an arcuate flange 56 that extends upwardly from the innermost edge of the cam 54 in spaced relationship to its corresponding member 20 or 22 as the case may be for engagement with and disposition in overlapping relationship to the innermost face of flange 16. It is thus seen that when the levers 50 are swung to an operative position, the flange 16 is wedged tightly between the up-turned arcuate flange 56 and the proximal member 20 or 22 of support 10. Since the cams 54 of the levers 50, bear tightly against the lowermost edge of the flange 16, the element 18 of support 10 that overlies a portion of top panel 12, is held tightly against top 12 and against displacement therefrom. Accordingly, the two levers cooperate in holding the entire support 10 tightly against that portion of the table 10 which the support contacts.

A spring 58 is provided for each lever 50 respectively and joins with the cam 54 at its one end with an opposed member 20 or 22 at its opposite end. Pins 60 in the members 20 and 22, receive the proximal end of springs 58; thus the lever 50 on the member 20 has a spring that is connected to the member 22 and the lever 50 on the member 22 has a spring 58 that is joined with the member 20 of support 10.

To release the entire assembly, the operator merely swings the two levers 50 downwardly on their respective pivots 52 against the action of the two springs 58 to release the levers 50 in their normal engagement with flange 16, whereupon the entire support 10 and all of its component parts, including glass holder 24 and ash tray 30, are detached from table 12.

In the modification shown in Figs. 7 and 8 of the drawings, there is provided a support 100 formed substantially the same as the support 10, just above described and provided with an element 102 that overlaps top panel 104 of table 106. The support 100 is also provided with a pair of down-turned members, one only of which is illustrated in Figs. 7 and 8 and designated by the numeral 108. These members 108 overlap flange 110 of table 106 in the same manner as above described with respect to the modification of Figs. 1 to 6 inclusive. Obviously, the support 100 has a glass holder and an ash tray secured thereto in the same manner as above described with respect to holder 24 and ash tray 30, but the same has not been illustrated in Figs. 7 and 8.

In lieu of the mechanism 48, there is provided a modified form of clamping mechanism, broadly designated by the number 112 for each member 108 respectively. These two mechanisms 112 each include an externally threaded bolt 114 having a knurled knob 116 on one end thereof that is disposed on the outermost face of the respective member 108. The bolt 114 passes through an arcuate slot 118 formed in the member 108 adjacent flange 110 with a portion of slot 118 disposed below the lowermost edge of flange 110. A short link 120 on the innermost face of member 108 is pivoted at one end thereof as at 122, directly to the member 108 adjacent the lowermost edge thereof, and the bolt 114 passes through an opening in the opposite end of the link 120.

A pair of inturned ears 124 on the link 120, intermediate the ends thereof, receive an L-shaped bracket 126 that is also secured directly to a serrated nut 128 normally disposed on the innermost face of flange 110. Nut 128 is threaded upon the innermost end of the bolt 114. When the mechanisms 112 are placed in use, the operator grasps the knob 116 thereof, swings the link 120 upwardly until the same bears against the lowermost edge of flange 110 and until a portion of the nut 128 overlaps the innermost face of flange 110. Turning of the knob 116 in one direction moves nut 128 against flange 110 and clamps the latter between nut 128 and the opposed member 108.

The uppermost edge of the link 120 adjacent that end thereof proximal to bolt 114, serves as a cam in the same manner as cam 54 in mechanisms 48 and thereby serves to hold the element 102 tightly against the uppermost face of the top 104 of table 106.

In the modification illustrated in Figs. 9 to 12 inclusive, there is provided a support, broadly designated by the numeral 200, having an element 202 that overlies a portion of the top panel 204 of a table 206. The element 202 of support 200, takes the form of an elongated strap in this modification rather than a flat plate, as shown at 18 and 102 in the modifications previously described.

The element 202 is provided with a pair of down-turned members 208, that overlap the flange 210 of table 206. Here again, the members 208 constitute continuations of the strap-like element 202 and in this respect, differ from the plates that comprise elements 20, 22 and 108 of the above described forms.

An ash tray 212 has a circumscribing out-turned flange 214 at the uppermost edge thereof, that merges with and is integral with an out-turned flange 216 of a glass holder, broadly designated by the numeral 218. Glass holder 218 includes an annular band 220 upon which the flange 216 thereof is formed, and a pair of crossed U-shaped straps 222 and 224 that depend from and are secured at their uppermost ends directly to the band 220.

The ash tray 212 and the holder 218 for glass 226, are secured to the support 200 through the medium of a continuous rod formed from resilient material. This elongated rod is bent midway between the ends thereof in a loop 228, that completely circumscribes the band 220 of glass holder 218 immediately below the flange 216.

The ends of the rod having loop 228 formed therein, extend from the band 220 at right angles and present a pair of elongated arms 230. It is noted that one of the arms 230 extends from the band 220 in underlying supporting relationship with a portion of the flange 214 of ash tray 212, and that the flange 216 of glass holder 218, extends as at 232, along one side of the table 206, this extension 232 also resting upon one of the arms 230. The flanges 214 and 216, and the extension 232, project in a portion 234 that underlies the lowermost edge of the flange 210 in the manner illustrated in Fig. 9. Each of the down-turned members 208, of the support 200, is provided on its outermost face with two spaced apart, vertical rows of outwardly projecting ears 236. These ears 236 are all spaced apart a sufficient distance to receive the corresponding arm 230 that traverses the member 208 and interconnects the rows of ears 236. After the arms 230 are disposed within their respective ears 236, a U-shaped fastening clip 238, is moved into place upon the ears 236.

Each row of the ears 236 is provided with aligned openings for slidably receiving the legs of the clip 238, and clip 238 thereby serves as a means for releasably holding the arm 230 secured to the respective member 208.

Figure 12:
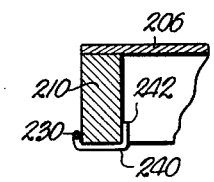
Fig. 12 is a detailed cross-sectional view taken on line XII—XII of Fig. 10, looking in the direction of the arrows.

The outermost free ends of the arms 230 are each provided with a loop having a portion 240 that underlies the flange 210 and a part 242 that extends upwardly in overlying relationship to the innermost face of flange 210, as clearly illustrated in Fig. 12. A relatively tight fit is provided between the portion 242 of arms 230 to the end that the members 208 are held tightly against the flange 210, and because of the inherent resiliency of the arms 230, the element 202 of support 200, will be held flatly and tightly against the top 204 of table 206.

Through this modification, it is possible to accommodate tables having flanges 210 of differing widths by simply removing clip 238 and positioning the arms 230 within the ears 236 at any desired position along the members 208.

It is also seen in this modification, that the arms 230 hold that portion 234 of the glass holder and ash tray assembly, tightly against the lowermost edge of the flange 210 and when the holding mechanism that includes arms 230, is released, the glass holder and ash tray assembly is itself entirely removable from the arms 230 and loop 228.

Figure 13:
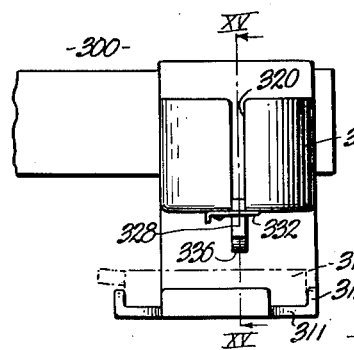
Fig. 13 is a side elevational view of another form of my present invention.
Figure 15:
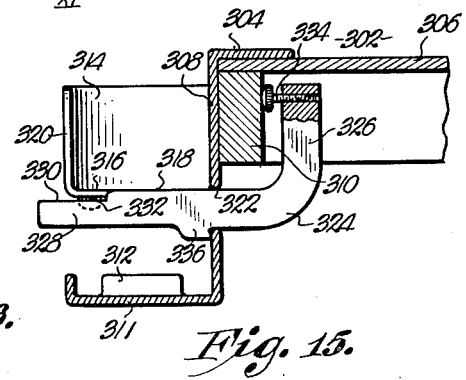
Fig. 15 is a vertical, cross-sectional view taken on line XV—XV of Fig. 13.
Figure 14:
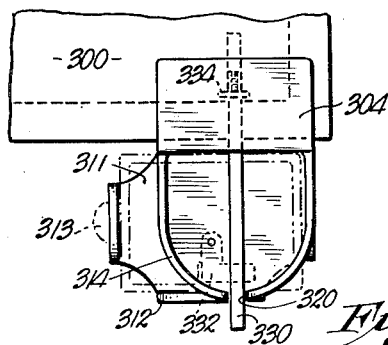
Fig. 14 is a top plan view thereof.

The mounting structure for a combination glass holder and ash tray assembly, shown in the modification of Figs. 13 to 15 inclusive, is formed to permit mounting thereof on a table 300 at any desired position, but not necessarily at the corner of table 300 as in the modifications thus far described.

This modification includes a support 302, having an element 304 that overlies and rests upon top panel 306 of table 300. The support 302 is provided with a single down-turned member 308 that overlaps and bears against flange 310 of table 300. The member 308 extends a substantial distance below the lowermost edge of flange 310 and has an outwardly extending flange 311 at the lowermost end thereof that projects oppositely from the element 304 of support 302.

Flange 311 has a plurality of up-turned ears 312 for holding an ash tray 313 against displacement when disposed in resting relationship upon the uppermost face of flange 311.

An open top tubular glass holder 314 is secured to the member 308 intermediate the ends thereof and, if desired, a portion of the outermost face of member 308, may constitute a part of the holder 314, as shown.

Glass holder 314 is provided with a bottom wall 316 that is spaced above and parallel with the flange 311. Bottom wall 316 has an elongated slot 318, extending thereacross in perpendicular relationship to the member 308, said slot 318 continuing upwardly as at 320 into the side of holder 314. Thus, an L-shaped slot is provided in portions 318 and 320. The member 308 has an opening 322 provided therein next adjacent the wall 316 and extending downwardly therefrom, that is in direct alignment with the slot 318 of wall 316.

An L-shaped lever 324 is disposed in looped relationship with the flange 310 in that one leg 326 thereof, projects upwardly and in spaced apart relationship with the innermost face of flange 310. The other leg 328 of lever 324 passes through the opening 322 of member 308 and extends in underlying relationship to the bottom 316 of glass holder 314. The width of the lever 324 is slightly less than the width of the slots 318 and 320. A portion of the leg 328 of lever 324 is disposed within the slot 318 in closed relationship thereto and leg 328 has its uppermost edge cut away as at 330 for receiving a latch 332 pivotally secured to the lowermost face of wall 316. Latch 332 is movable to and from a position overlying the portion 330 of the leg 328 and thereby serving as a support for the glass holder 314.

A short bolt 334 is threaded in leg 326 adjacent the free end thereof and extends outwardly toward the innermost face of flange 310. When this bolt 334 is rotated to move the same toward flange 310, the member 308 will be moved tightly against the outer face of flange 310 because of the fact that the leg 328 is provided with a down-turned ear 336 that bears against the outermost face of the member 308 immediately below the opening 322 and prevents movement of the lever 324 in one direction within opening 322.

Removal of the assembly of the modification of Figs. 13 to 15 inclusive, is accomplished by merely swinging the latch 332 from the operative position between bottom 316 and leg 328, whereupon the leg 328 is swingable upwardly through the slots 318 and 320. During such swinging movement, the lowermost end of the opening 322 serves as a fulcrum point and the bolt 334 moves away from the flange 310. The bolt 334 can be adjusted prior to attachment of the assembly to the table 300, whereupon a tight fit will be effected upon movement of latch 332 to the operative position.

Having thus described my invention, what I claim as new and desire to secure by Letters Patent is:

1. For a table having a top and a peripheral flange depending from said top, the improvement of which consists of structure for mounting a combination ashtray and glass holder assembly on said table, said structure comprising a support for said assembly having an element adapted to overlie and rest upon a portion of said top and a member adapted to overlie a portion of the outermost face of said flange; and means on said member and engageable with said flange for releasably clamping the latter on the flange, said means having a part adapted to bear against the innermost face of said flange for drawing said member against said outermost face of the flange.

2. For a table having a top and a peripheral flange depending from said top, the improvement of which consists of structure for mounting a combination ashtray and glass holder assembly on said table, said structure comprising a support for said assembly having an element adapted to overlie and rest upon a portion of said top and a member adapted to overlie a portion of the outermost face of said flange; and means on said member and engageable with said flange for releasably clamping the latter on the flange, said means having parts extending from the member and adapted to be disposed in looped relationship with the lowermost edge of said flange and to bear against the innermost face of the flange for drawing the member against said outermost face of the flange.

3. For a device having a top panel and a pair of sides meeting at a corner, the improvement of which consists of structure for mounting at least one article holder on said device, said structure comprising a support for said holder having an element adapted to overlie and rest upon a portion of said top panel and a member adapted to overlie a portion of the outermost face of each of said sides respectively; and releasable mechanism on each member respectively and engageable with a corresponding side for drawing the members against their respective sides.

4. For a device having a top panel and a pair of sides meeting at a corner, the improvement of which consists of structure for mounting at least one article holder on said device, said structure comprising a support for said holder having an element adapted to overlie and rest upon a portion of said top panel and a member adapted to overlie a portion of the outermost face of each of said sides respectively; and releasable mechanism on each member respectively and engageable with a corresponding side for drawing the members against their respective sides, said mechanisms each including a swingably mounted lever having parts adapted to overlie and engage a portion of the innermost face of its corresponding side when the lever is at one end of its path of travel.

5. For a device having a top panel and a pair of sides meeting at a corner, the improvement of which consists of structure for mounting at least one article holder on said device, said structure comprising a support for said holder having an element adapted to overlie and rest upon a portion of said top panel and a member adapted to overlie a portion of the outermost face of each of said sides respectively; and releasable mechanism on each member respectively and engageable with a corresponding side for drawing the members against their respective sides, said mechanisms each including a swingably mounted lever having parts adapted to overlie and engage a portion of the innermost face of its corresponding side and adapted to engage the lowermost edge of its corresponding side when the lever is at one end of its path of travel for holding said element against said top panel and said members against said sides.

6. For a device having a top panel and a pair of sides meeting at a corner, the improvement of which consists of structure for mounting at least one article holder on said device, said structure comprising a support for said holder having an element adapted to overlie and rest upon a portion of said top panel and a member adapted to overlie a portion of the outermost face of each of said sides respectively; and releasable mechanism on each member respectively and engageable with a corresponding side for drawing the members against their respective sides, said mechanisms each including a swingably mounted lever having parts adapted to overlie and engage a portion of the innermost face of its corresponding side when the lever is at one end of its path of travel, said levers being adapted for pivotal attachment to the respective sides thereof.

7. For a table having a top and a peripheral flange depending from said top, the improvement of which consists of structure for mounting a combination ashtray and glass holder assembly on said table, said structure comprising a support for said assembly having an element adapted to overlie and rest upon a portion of said top and a member adapted to overlie a portion of the outermost face of said flange; means on said member and engageable with said flange for releasably clamping the latter on the flange; and yieldable means for holding the clamping means in engagement with said flange.

8. For a device having a top panel and a pair of sides meeting at a corner, the improvement of which consists of structure for mounting at least one article holder on said device, said structure comprising a support for said holder having an element adapted to overlie and rest upon a portion of said top panel and a member adapted to overlie a portion of the outermost face of each of said sides respectively; releasable mechanism on each member respectively and engageable with a corresponding side for drawing the members against their respective sides; and yieldable means for each mechanism respectively for holding the latter in engagement with the respective side.

9. For a device having a top panel and a pair of sides meeting at a corner, the improvement of which consists of structure for mounting at least one article holder on said device, said structure comprising a support for said holder having an element adapted to overlie and rest upon a portion of said top panel and a member adapted to overlie a portion of the outermost face of each of said sides respectively; releasable mechanism on each member respectively and engageable with a corresponding side for drawing the members against their respective sides, said mechanisms each including a swingably mounted lever having parts adapted to overlie and engage a portion of the innermost face of its corresponding side when the lever is at one end of its path of travel; and yieldable means for each lever respectively for holding the same biased against its side.

10. For a device having a top panel and a pair of sides meeting at a corner, the improvement of which consists of structure for mounting at least one article holder on said device, said structure comprising a support for said holder having an element adapted to overlie and rest upon a portion of said top panel and a member adapted to overlie a portion of the outermost face of each of said sides respectively; releasable mechanism on each member respectively and engageable with a corresponding side for drawing the members against their respective sides, said mechanisms each including a swingably mounted lever having parts adapted to overlie and engage a portion of the innermost face of its corresponding side when the lever is at one end of its path of travel; and means for each lever respectively and joining the same with its member for moving the same toward its member to clamp the side tightly therebetween.

11. For a device having a top panel and a pair of sides meeting at a corner, the improvement of which consists of structure for mounting at least one article holder on said device, said structure comprising a support for said holder having an element adapted to overlie and rest upon a portion of said top panel and a member adapted to overlie a portion of the outermost face of each of said sides respectively; and releasable mechanism on each member respectively and engageable with a corresponding side for drawing the members against their respective sides, said mechanisms each including a swingably mounted lever having parts adapted to overlie and engage a portion of the innermost face of its corresponding side when the lever is at one end of its path of travel, said levers each including an elongated, resilient arm disposed to yieldably hold said element against said top panel.

12. For a table having a top and a peripheral flange depending from said top, the improvement of which consists of structure for mounting a combination ashtray and glass holder assembly on said table, said structure comprising a support for said assembly having an element adapted to overlie and rest upon a portion of said top and a member adapted to overlie a portion of the outermost face of said flange; and means on said member and engageable with said flange for releasably clamping the latter on the flange, said means including an arm extending from the member and terminating in a portion adapted to be disposed in overlapping relationship to said flange, and means on the arm for forcing the same away from the flange to draw the member against the outermost face of the flange.

References Cited in the file of this patent

UNITED STATES PATENTS

| Number | Name | Date |
|---|---|---|
| 618,510 | Kail | Jan. 31, 1899 |
| 1,033,052 | Herrold | July 16, 1912 |
| 1,094,331 | Hollander | Apr. 21, 1914 |
| 1,681,210 | Banks | Aug. 21, 1928 |
| 1,801,637 | Nichols | Apr. 21, 1931 |
| 1,813,155 | Furstenberger et al. | July 7, 1931 |
| 1,993,702 | Brunhoff | Mar. 5, 1935 |
| 2,147,539 | Marchant | Feb. 14, 1939 |